(12) United States Patent
Hierzer

(10) Patent No.: US 10,330,269 B2
(45) Date of Patent: Jun. 25, 2019

(54) ILLUMINATING DEVICE AND LIGHTING UNIT

(71) Applicant: H4X e.U., Graz (AT)

(72) Inventor: Andreas Hierzer, Graz (AT)

(73) Assignee: H4X e.U., Graz (AT)

( * ) Notice: Subject to any disclaimer, the term of this patent is extended or adjusted under 35 U.S.C. 154(b) by 61 days.

(21) Appl. No.: 15/795,391

(22) Filed: Oct. 27, 2017

(65) Prior Publication Data

US 2018/0119906 A1    May 3, 2018

(30) Foreign Application Priority Data

Oct. 28, 2016   (DE) .................. 10 2016 221 257

(51) Int. Cl.
*F21V 21/00*    (2006.01)
*F21S 8/02*    (2006.01)
(Continued)

(52) U.S. Cl.
CPC .............. *F21S 8/026* (2013.01); *F21S 4/28* (2016.01); *F21S 8/04* (2013.01); *F21S 8/043* (2013.01); *F21V 3/02* (2013.01); *F21V 3/062* (2018.02); *F21V 15/013* (2013.01); *F21V 17/164* (2013.01); *F21V 21/02* (2013.01); *F21V 21/025* (2013.01); *F21V 21/049* (2013.01);
(Continued)

(58) Field of Classification Search
None
See application file for complete search history.

(56) References Cited

U.S. PATENT DOCUMENTS

| | | |
|---|---|---|
| 9,726,339 B2 | 8/2017 | Hierzer |
| 2006/0152945 A1 | 7/2006 | Lantzsch et al. |

(Continued)

FOREIGN PATENT DOCUMENTS

| | | |
|---|---|---|
| DE | 20308466 U1 | 12/2003 |
| DE | 202004005794 U1 | 9/2005 |

(Continued)

OTHER PUBLICATIONS

European Search Report dated Mar. 5, 2018 issued in corresponding EP 17196888.6 application (9 pages).
(Continued)

*Primary Examiner* — Vip Patel
(74) *Attorney, Agent, or Firm* — Millen, White, Zelano & Branigan, P.C.; William Nixon

(57) ABSTRACT

An illuminating device has a planar, elongate lighting unit and a profile-shaped carrier component. The lighting unit can be fixed to the carrier component. The lighting unit has a profile element which is permeable to light and has a cross-sectional shape which is U-shaped in some portions, opposing limbs of the U-shaped cross-sectional shape extend substantially in the thickness direction of the lighting unit, and an inner region of the profile element is formed with an opening formed between the limbs by the U-shaped cross-sectional shape. The lighting unit has a planar base part which is arranged in the region of the opening and is coupled to the profile element. The profile element is formed by a material which offers less resistance to a deformation than a second material by which the planar base part is formed. In the inner region, a light-generation device is arranged in this case.

20 Claims, 5 Drawing Sheets

(51) Int. Cl.
    *F21S 4/28*     (2016.01)
    *F21S 8/04*     (2006.01)
    *F21V 15/01*     (2006.01)
    *F21V 17/16*     (2006.01)
    *F21V 21/02*     (2006.01)
    *F21V 21/04*     (2006.01)
    *F21V 3/02*     (2006.01)
    *G02B 6/00*     (2006.01)
    *F21V 3/06*     (2018.01)
    *F21Y 115/10*     (2016.01)
    *F21S 8/06*     (2006.01)
    *F21Y 103/00*     (2016.01)

(52) U.S. Cl.
    CPC .................. *G02B 6/00* (2013.01); *F21S 8/06* (2013.01); *F21Y 2103/00* (2013.01); *F21Y 2115/10* (2016.08)

(56) References Cited

U.S. PATENT DOCUMENTS

2015/0260354 A1     9/2015   Hierzer
2016/0010817 A1     1/2016   Hierzer

FOREIGN PATENT DOCUMENTS

| | | |
|---|---|---|
| DE | 102008016166 A1 | 10/2009 |
| DE | 202011104306 U1 | 12/2011 |
| DE | 102014204544 A1 | 9/2015 |
| DE | 102014213468 A1 | 1/2016 |
| DE | 102014112657 A1 | 3/2016 |
| GB | 1223825 A | 3/1971 |
| WO | 2014/038312 A1 | 3/2014 |

OTHER PUBLICATIONS

English Abstract of DE 102014112657 published Mar. 3, 2016.
English Abstract of DE 102008016166 A1 published Oct. 8, 2009.
English Abstract of DE 202011104306 U1 published Dec. 15, 2011.

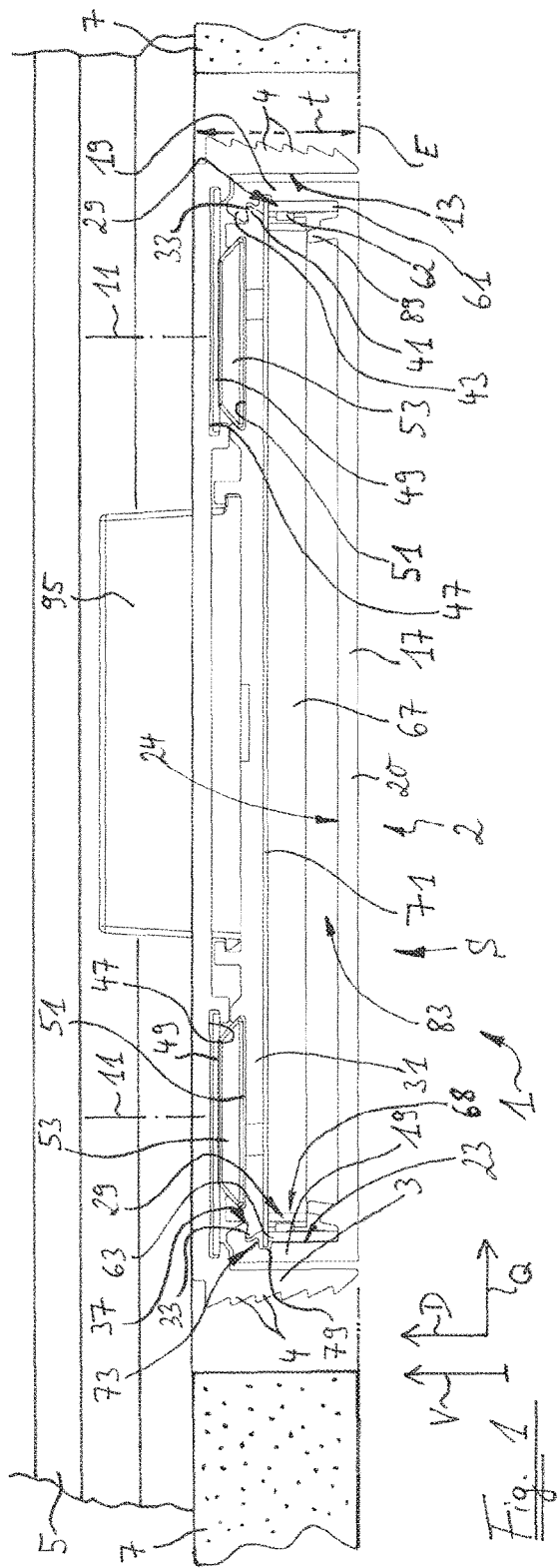
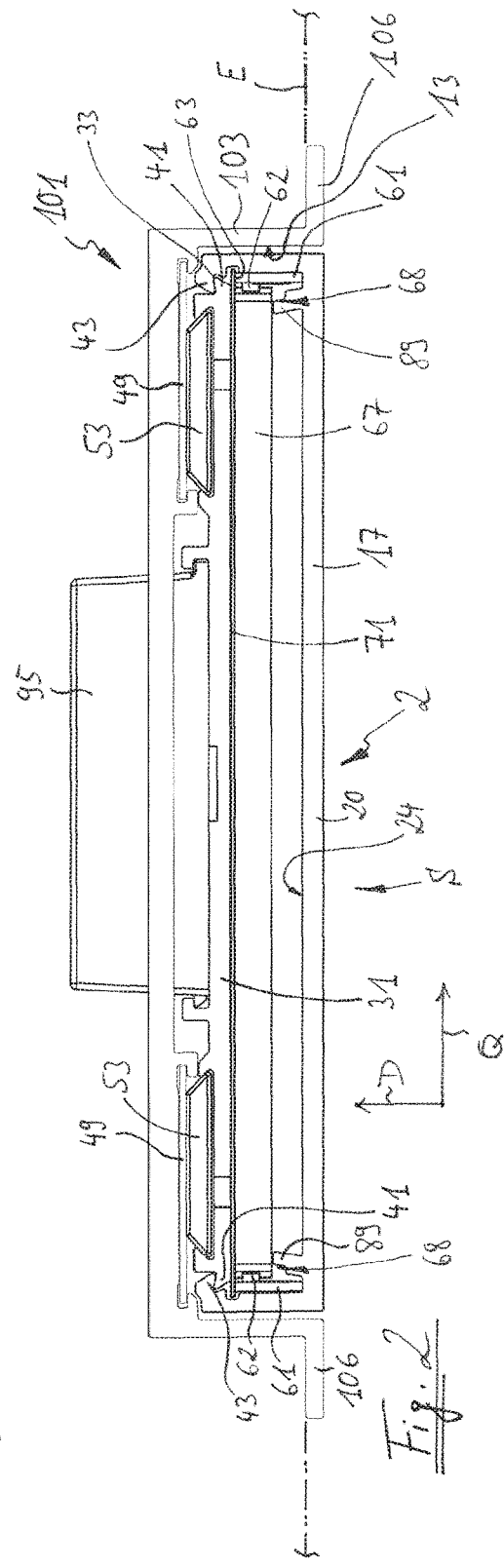

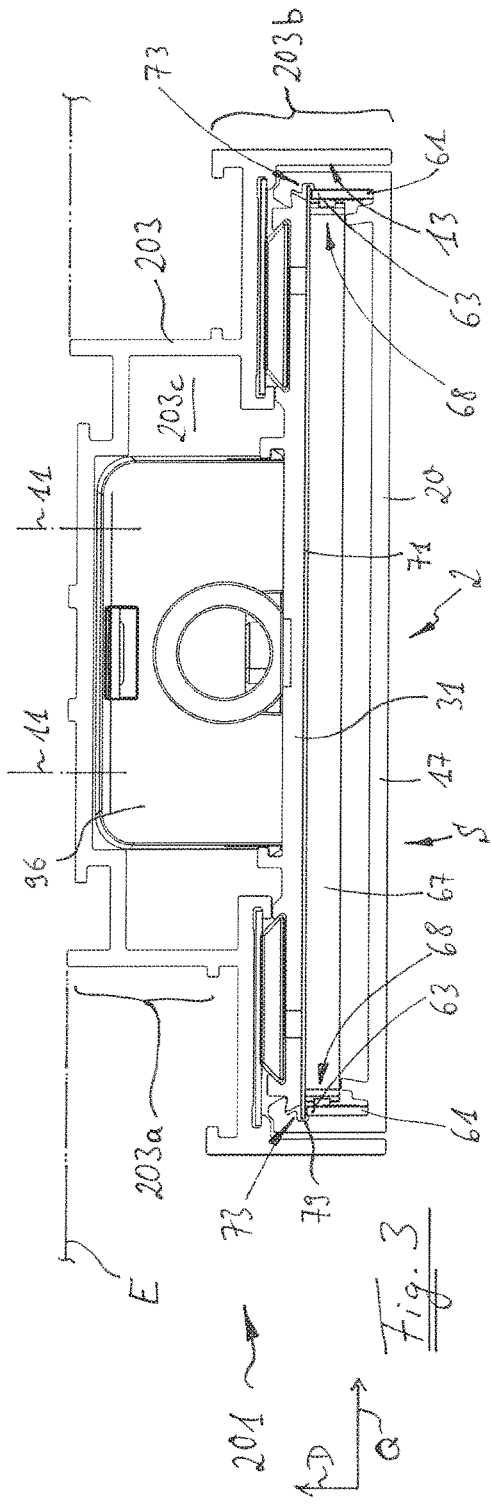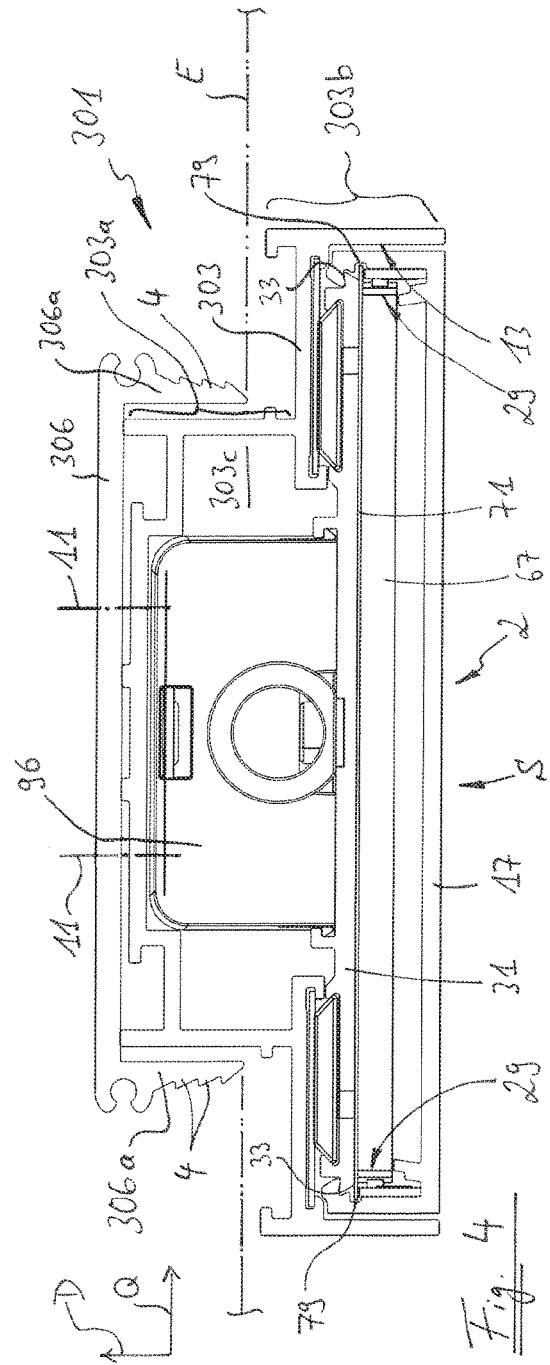

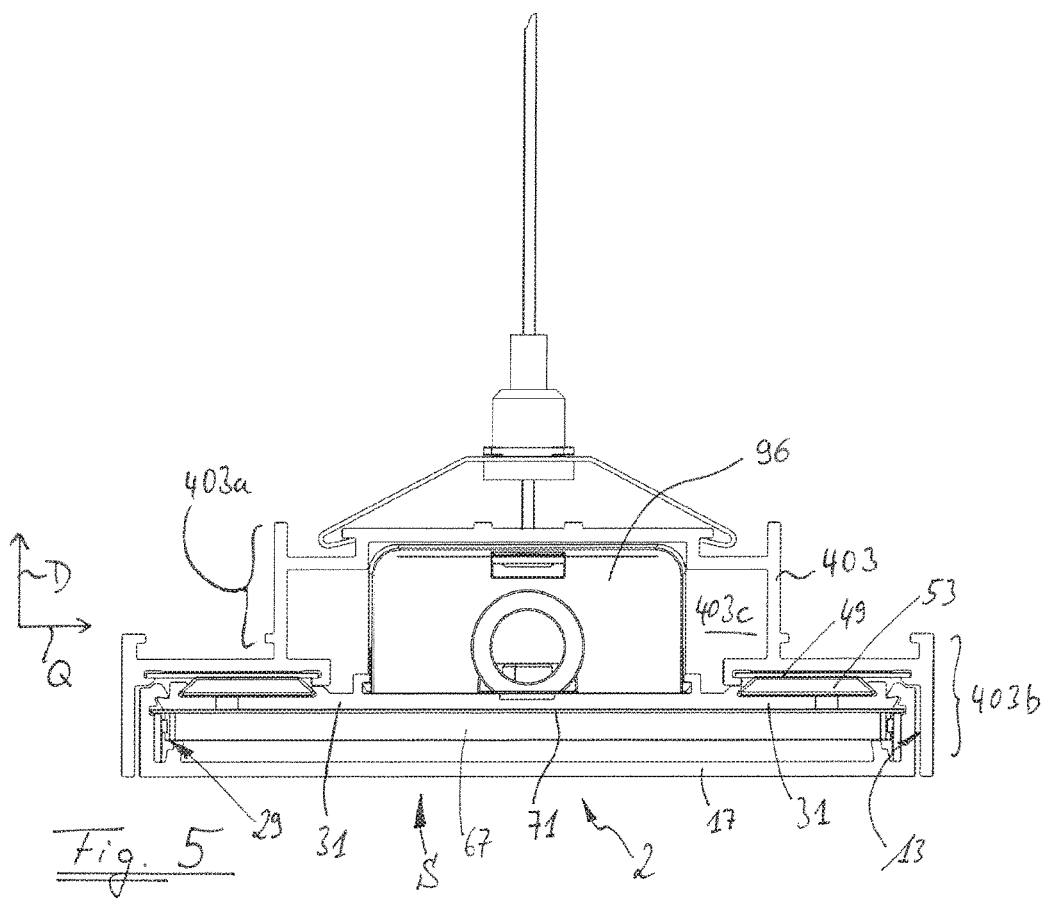

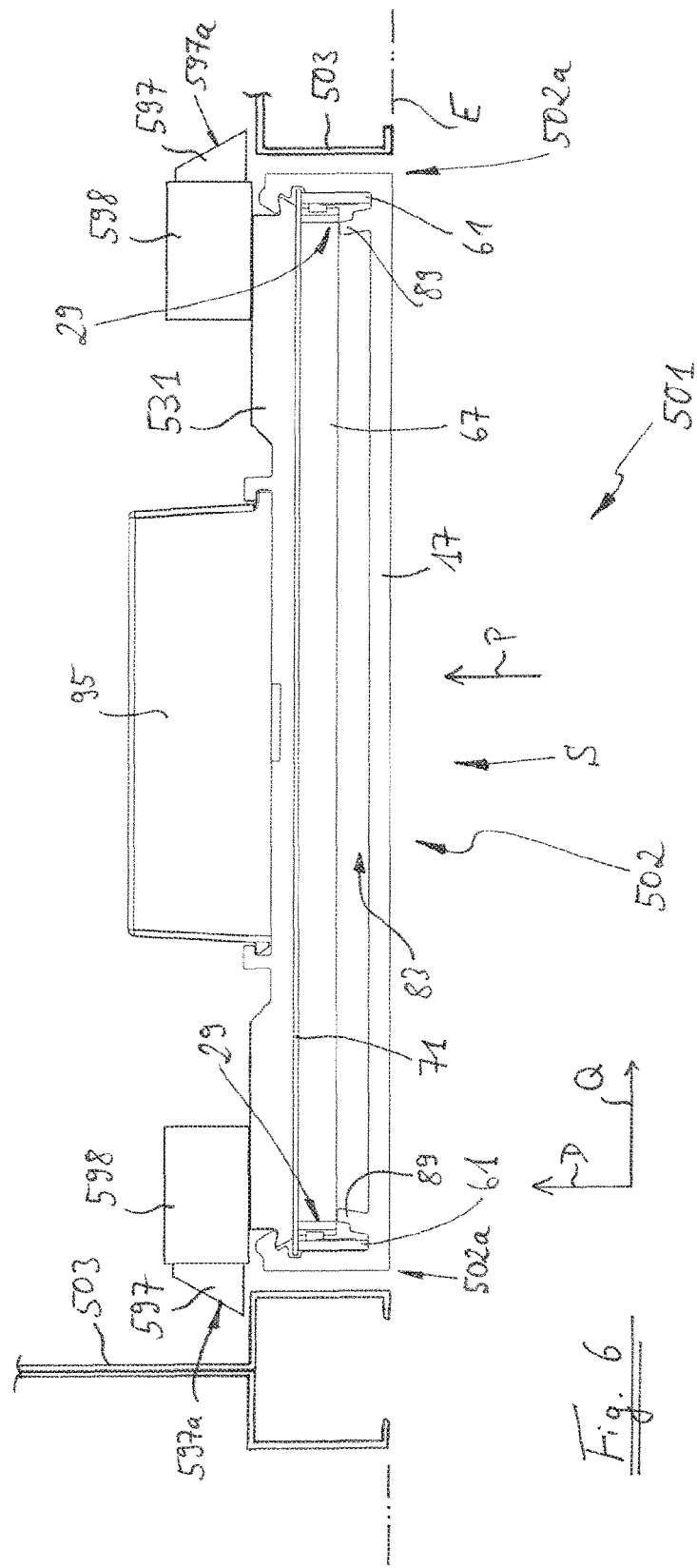

ILLUMINATING DEVICE AND LIGHTING UNIT

FIELD OF THE INVENTION

The invention relates to an illuminating device and to a lighting unit.

TECHNICAL BACKGROUND

Although the present invention can be applicable and useful in the case of illuminating devices and illuminating assemblies of a wide variety of types, the problem addressed by the invention will be described in greater detail below using the example of a light fitting for assembly in the ceiling region.

In particular in the case of new buildings, for example as a result of settling processes of the structure, a solid raw ceiling may move slightly, and/or an intermediate ceiling attached thereto, which is formed for example by plasterboard panels, may "move up" slightly after the completion of the ceiling. The geometries of the raw ceiling, the intermediate ceiling and the support structure thereof in this case undergo change over a relatively prolonged period of time, but said change is relatively small by comparison with the overall dimensions of the structure. Thus for example in new buildings, a lowering of up to 8 mm over a distance of 3 m can still be considered acceptable. If, after the conclusion of the building work, changes in geometry of this type occur to an acceptable extent, elements which are rigidly fastened in or to the intermediate ceiling, the support structure thereof and/or to the raw ceiling can also undergo a deformation.

DE 10 2014 204 544 A1 describes a planar profile light fitting for installation in a plasterboard construction. Said planar profile light fitting comprises an optical unit which is interchangeably fixed in a carrier profile. The profile light fitting described in DE 10 2014 204 544 A1 in this case has a reduced installation depth, by means of which an aesthetically pleasing shape of the installed profile light fitting is achieved.

Light fittings for example in the ceiling region can often have relatively large dimensions. It would therefore be desirable, for example also in the case of observable settling processes and especially in the case of light fittings having relatively large dimensions, in particular having a relatively great length, to be able to achieve as aesthetically pleasing an appearance as possible in an improved and simpler manner when changes occur in the structure as a result of settling or "moving up". In addition, it would be desirable, also in the case of changes in geometry resulting from other causes, to be able to achieve an aesthetic appearance of this type in a simpler and better manner.

SUMMARY OF THE INVENTION

In view of the above, it is an idea of the invention to provide a developed illuminating device by means of which undesirable effects of changes in geometry of a construction or of a structure and/or of deformations of a component of the illuminating device on the aesthetic effect of the illuminating device can be avoided in an even better manner. Furthermore, a correspondingly developed lighting unit is to be provided.

Accordingly, an illuminating device comprising a planar, elongate lighting unit and comprising a profile-shaped carrier component is proposed, wherein the lighting unit is constructed for fixing thereof to the carrier component. The lighting unit comprises a profile element which is permeable to light in at least some portions and has a U-shaped cross-sectional shape in at least some portions. Opposing limbs of the U-shaped cross-sectional shape extend substantially in the thickness direction of the lighting unit, and an inner region of the profile element is formed with an opening formed between the limbs by the U-shaped cross-sectional shape. Furthermore, in this case, the lighting unit comprises a planar base part which is arranged in the region of the opening and is coupled to the profile element. According to the invention, the profile element which is permeable to light in at least some portions is formed by a first material which offers less resistance to a deformation than a second material by which the planar base part is formed. In the inner region, a light-generation device for generating light which can be emitted in operation by the lighting unit is arranged.

Furthermore, a lighting unit, in particular for an illuminating device of this type, is proposed, wherein the lighting unit is designed to be planar and elongate and is constructed for fixing thereof to a profile-shaped carrier component. In this case, the lighting unit comprises a profile element which is permeable to light in at least some portions and has a cross-sectional shape which is U-shaped in at least some portions, opposing limbs of the U-shaped cross-sectional shape extend substantially in the thickness direction of the lighting unit, and an inner region of the profile element is formed with an opening formed between the limbs by the U-shaped cross-sectional shape. The lighting unit further comprises a planar base part which is arranged in the region of the opening and is coupled to the profile element. The profile element which is permeable to light in at least some portions is formed by a first material which offers less resistance to a deformation than a second material by which the planar base part is formed. In the inner region, a light-generation device for generating light which can be emitted in operation by the lighting unit is arranged.

The concept on which the invention is based consists in designing the lighting unit in such a way that the lighting unit reacts relatively flexibly and resiliently to deformations. For example, in the case of lowering of a ceiling, to which the carrier component can be for example tightly coupled, the lighting unit of the illuminating device according to the invention can thus follow any deformation of the carrier component and adapt thereto in an improved manner. Likewise, an improved adaptation of the lighting unit to deformations of the carrier component can also be achieved when the deformation of the carrier component is attributed to other causes, for example to weights acting over relatively great lengths.

The improved flexibility of the lighting unit is made possible in particular in that the profile element which is permeable to light in at least some portions is designed with a U-shaped cross-sectional shape, whilst the base part is designed to be planar. An inner region for the lighting unit is provided by means of the U-shaped cross-sectional shape of the profile element. In this case, the cross-sectional shape of the profile element can be designed in particular as a whole to be substantially U-shaped. In this case, the base part can be deformed by bending comparatively easily due to the planar design thereof, even when said part is formed by a material which offers relatively great resistance to a deformation due to the material properties thereof. The profile element which is permeable to light in at least some portions, however, is formed by a material which can be deformed more easily, as a result of which, despite the U-shaped cross-sectional shape of the profile element, the lighting unit as a whole is sufficiently flexible and resilient.

An aesthetic appearance of the illuminating device is thus achieved in a better and simpler manner even in the case of "moving up" processes. Due to the fact that the lighting unit better follows the deformation of the carrier component, deviations in the desired orientation and positioning of the lighting unit relative to the carrier component and/or undesirably non-flush transitions can be avoided in a simpler manner.

Furthermore, further improved fixing of the lighting unit to the carrier component can also advantageously be achieved. Undesirable effects of forces between the lighting unit and the carrier component can be at least reduced by means of the resilience of the lighting unit. With regard to the fixing of the lighting unit in or to the carrier component, this can also contribute to improved support in the event of vibrations.

As a result, the lighting unit and illuminating device according to the invention can offer advantages when used in surroundings in which vibrations frequently occur, for example when heavy vehicles such as trains, lorries or construction vehicles are often moved in the nearby surroundings. For example, the lighting unit or illuminating device according to the invention can be advantageous when used in or near a train station. In addition, it is conceivable for the lighting unit and illuminating device proposed according to the invention to be able to be used advantageously even in the case of relatively strong tremors, such as occur in the event of an earthquake.

In one embodiment, a modulus of elasticity of the first material is lower than a modulus of elasticity of the second material. The first material per se thus offers less resistance to an elastic deformation than the second material.

In one embodiment, the profile element which is permeable to light in at least some portions is in the form of a profile made of the first material, and the planar base part is in the form of a profile made of the second material. The planar base element can thus provide the lighting unit with sufficient stability without resulting in too great a rigidity of the lighting unit. At the same time, by the profile element, by using the first material, a sufficient inner region can be provided without the U-shaped cross-sectional shape and in particular the limbs thereof excessively increasing the rigidity of the lighting unit.

In one embodiment, the lighting unit can be detachably attached to the carrier component. The lighting unit can thus advantageously be released from the carrier component again after the first assembly if required, for example to retrofit the lighting unit or change said unit in the event of damage.

In one embodiment, at least one base-part-side device for fixing the lighting unit to the carrier component is arranged on the base part. Means provided for fixing the lighting unit are thus arranged on a component which is formed by the second material, which per se offers greater resistance to a deformation than the first material of the profile element. The introduction of forces which act in the course of the fixing and holding of the lighting unit can thus take place in a component of the lighting unit which is formed by a relatively resistant material.

According to one development, at least one carrier-component-side device is arranged on the carrier component, which device cooperates with the base-part-side device for fixing the lighting unit to the carrier component. The lighting unit can thus be fixed to the carrier component in a quick and effective, in particular detachable, manner.

According to another development, it is provided that the lighting unit can be fixed to the carrier component by means of magnetic force and/or that the lighting unit can be fixed in an interlocking manner to the carrier component by means of a catch. Magnetic fixing makes it possible to hold the lighting unit on the carrier component in a reliable and effective manner, and additionally avoids wearing processes and movable and/or resilient components. In particular in the event of settling processes or other processes which lead to deformation of the carrier component, the fixing of the lighting unit by means of magnetic force can prove to be advantageous, since for example shifting movements of the lighting unit relative to the carrier component, such as can occur in the above-mentioned deformation processes, are tolerated without the fixing being released. Fixing the lighting unit by means of a catch, or another type of fixing engaging in an interlocking manner, offers a reliable interlocking coupling of the lighting unit to the carrier component and can be weight-saving.

In one embodiment, the carrier component is provided with at least one ferromagnetic element for fixing the lighting unit. In this way, the carrier component is constructed for effective magnetic fixing of the lighting unit to the carrier component.

In this case, the ferromagnetic element can be in the form of a sheet or a strip. In particular, in this case, the ferromagnetic element is held on the carrier component in a groove in the carrier component. In this way, space can be saved in the thickness direction of the lighting unit, and this is advantageous for a planar design of the lighting unit. In addition, holding the ferromagnetic element in the groove allows a simple yet reliable coupling thereof to the carrier component.

In one embodiment, the lighting unit comprises at least one magnet, in particular a permanent magnet, for fixing the lighting unit. Effective magnetic fixing of the lighting unit is thus achieved.

In this case, the magnet can be in the form of a strip. By means of a strip-shaped design of the magnet, space can also advantageously be saved, in particular in the thickness direction of the lighting unit.

In particular, the magnet can be held on the base part in a groove in the base part. In this case, the groove allows a simple and reliable coupling of the magnet to the base part.

In one embodiment, the light-generation device comprises at least one LED circuit board, which is arranged adjacently to one of the limbs in the inner region of the profile element. Light can thus be provided in an efficient, energy-saving manner, the LED circuit board advantageously not disrupting the light output by the lighting unit in operation by means of the arrangement thereof adjacently to the limb.

In one embodiment, the lighting unit comprises an insulation element which is in the form of a film or layer and is arranged on a side of the planar base part facing the inner region in order to shield, in an electrically insulating manner, the base part with respect to the LED circuit board. By means of this embodiment, electrical contact of the LED circuit board with the base part can advantageously be prevented, and said embodiment thus contributes to allowing operation of the lighting unit with electrical current at higher voltages, for example at voltages above the maximum permitted contact voltage. In this case, the distance between the circuit board and the base part can be kept to a minimum, which is advantageous for a compact, planar construction of the lighting unit. Operation at a higher voltage advantageously allows lower electrical currents in the lighting unit and for example the use of modified converters or, in some embodiments, the ability to operate the lighting unit without an additional electronic ballast.

In one embodiment, the insulation element protrudes beyond an edge of the LED circuit board in a direction which is transverse to the LED circuit board. In this case, the LED circuit board extends in particular transversely, for example substantially perpendicularly, to the insulation element. In particular, the insulation element protrudes beyond the edge of the LED circuit board towards the limb which is adjacent to the LED circuit board. The protruding arrangement further improves the electrical shielding of the base part from the circuit board. The path of possible leakage currents from the circuit board to the base part is enlarged. Leakage currents can be avoided or at least considerably reduced.

According to one development, the insulation element protrudes beyond a lateral edge of the planar base part towards the limb of the U-shaped cross-sectional shape which is adjacent to the LED circuit board. In this way, the shielding and insulation effect of the insulation element is further improved.

In another embodiment, the insulation element extends in an edge region thereof into a groove in the profile element which is permeable to light in at least some portions. This can also contribute to a further improved electrical insulation and shielding effect by the insulation element.

In another development, the insulation element is formed by an electrically insulating plastics material. In particular, the insulation element can be formed by a film or layer made of a plastics material of this type.

According to one development of the invention, in the inner region, a panel-shaped optical waveguide element is arranged substantially in parallel with the planar base part, the light-generation device being arranged adjacently to an edge region of the optical waveguide element for laterally feeding light into the optical waveguide element. By means of lateral feeding of this type (also referred to as edge coupling, lateral coupling or edge lighting), a good and uniform lighting effect of the lighting unit can be achieved with a small design size of the lighting unit in the thickness direction thereof at the same time, and the number of LEDs required is also reduced.

In one embodiment the lighting unit comprises a reflector between the planar base part and the optical waveguide element. The light provided by the LEDs and fed into the optical waveguide element can thus be used efficiently for the desired lighting effect, and losses can be avoided.

In one embodiment, the insulation element is arranged between the planar base part and the optical waveguide element and is in the form of a reflector and/or is provided with a light-reflecting component, in particular a light-reflecting layer or coating. In this way, a component can advantageously take over the functions of the insulation element and the reflector, and this reduces the number of components of the illuminating device and simplifies the assembly of the lighting unit.

In one embodiment, a clearance is formed adjacently to a bottom of the inner region, which clearance is constructed to receive a panel-shaped optical element, in particular a microprismatic panel, if required. By means of a microprismatic panel, it is possible to vary the illumination effect achieved and/or to provide additional glare suppression.

According to a further development, the profile element which is permeable to light in at least some portions is produced from a plastics material as the first material.

In particular, in another development, the plastics material from which the profile element, which is permeable to light in at least some portions, is formed can be a polymethyl methacrylate (PMMA).

In one embodiment, the planar base part is in the form of a base profile which is produced from a metal material as the second material.

In another development, the metal material from which the base profile is formed can be aluminium or an aluminium alloy.

In particular, by a combination of a profile element, which is produced from a plastics material and is permeable to light in at least some portions, with a planar base part which is produced from a metal material, material properties for the profile element and the base part can be achieved which make it possible to obtain sufficient stability and simultaneously good resilience of the lighting unit.

In one embodiment, the base part and the profile element which is permeable to light in at least some portions each comprise connection devices which are formed so as to correspond to one another to interconnect the base part and the profile element in an interlocking manner. The profile element can thus be reliably connected to the base part in a simple manner.

In one embodiment, the carrier component is in the form of a carrier profile produced from a metal material. The carrier component can thus be provided with the required stability.

According to a further development, the metal material from which the carrier profile is formed can be aluminium or an aluminium alloy.

In one embodiment, the carrier component is formed with a receiving region for receiving the lighting unit.

According to one embodiment, the lighting unit can be received in the carrier component and/or can be fixed to the carrier component in such a way that the lighting unit is substantially flush with the carrier component on a visible side of the lighting unit. An illuminating device of this type can be particularly pleasing from an aesthetic perspective.

In one embodiment, the carrier component is designed to be rigidly mounted on a structure or a construction attached to a structure. According to an alternative embodiment, the carrier component can be constructed to be suspended on a structure or a construction attached to a structure.

In the embodiments, the construction can be a panel construction, in particular a plasterboard panel construction, or a support structure for said construction. The construction can be arranged in particular in the ceiling region or in the wall region.

In particular, in one embodiment of the invention, the carrier component can be designed for installation in at least some portions in the panel construction.

In one development, the carrier component can be formed in full or in at least some portions as a plaster profile.

Furthermore, in one development, the illuminating device can comprise an additional plaster profile in which the carrier component can be received in some portions, the carrier component and the plaster profile being designed for rigidly fixing the carrier component to the additional plaster profile.

In one embodiment, the carrier component can be constructed to be rigidly installed in a recess in a solid ceiling or wall.

In further developments, the additional plaster profile can be designed for installation in at least some portions in the panel construction or can be constructed to be rigidly installed in a recess in a solid ceiling or wall.

In another embodiment, the carrier component can be constructed to be mounted on a panel construction, in particular a plasterboard panel construction, or on a solid wall or ceiling.

In another embodiment, the illuminating device comprises suspension means for fixing the carrier component in a suspended manner. In this embodiment, the carrier component and the lighting unit fixed to the carrier component can thus be used as a suspended light fitting.

By means of the above-mentioned developments of the carrier component, in particular for installation in a wall or ceiling or panel construction or for mounting on a wall or ceiling or panel construction or for suspended fixing, diverse illumination requirements can be met.

The above embodiments and developments can be combined with one another as desired where appropriate. Further possible embodiments, developments and implementations of the invention also include combinations not explicitly mentioned of features of the invention described above or in the following with respect to the embodiments. In particular, a person skilled in the art will also add individual aspects to each basic form of the present invention as improvements or additions.

BRIEF DESCRIPTION OF THE DRAWINGS

The present invention will be described in greater detail below by way of the embodiments set out in the schematic drawings, in which:

FIG. 1 is a cross-sectional view of an illuminating device according to a first embodiment of the invention;

FIG. 2 is a cross-sectional view of an illuminating device according to a second embodiment of the invention;

FIG. 3 is a cross-sectional view of an illuminating device according to a third embodiment of the invention;

FIG. 4 is a cross-sectional view of an illuminating device according to a fourth embodiment of the invention;

FIG. 5 is a cross-sectional view of an illuminating device according to a fifth embodiment of the invention;

FIG. 6 is a cross-sectional view of an illuminating device according to a sixth embodiment of the invention.

Figure 7:
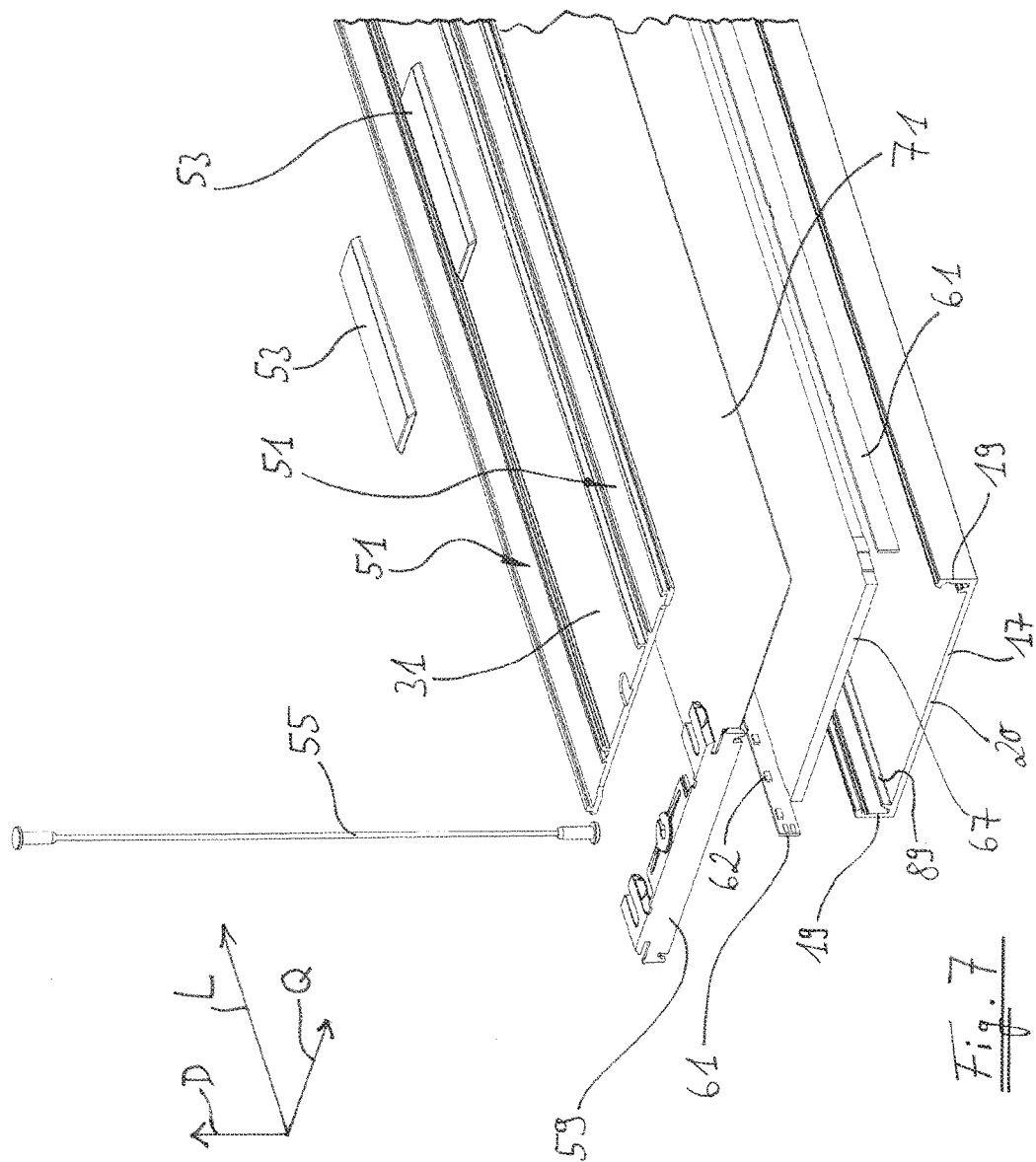
FIG. 7 is an exploded view of a lighting unit of an illuminating device according to the first, second, third, fourth or fifth embodiment.

The accompanying drawings are intended to provide a further understanding of the embodiments of the present invention. They illustrate embodiments and are intended to explain principles and concepts of the invention in connection with the description.

Other embodiments and many of the stated advantages can be seen from the drawings. The elements of the drawings are not necessarily shown to scale with respect to one another.

In the drawings, unless specified otherwise, elements, features and components which are like, functionally equivalent or have the same effect are each provided with the same reference numerals.

DETAILED DESCRIPTION OF EMBODIMENTS

FIG. 1 shows an illuminating device 1 according to a first embodiment in cross section. The illuminating device 1 comprises a lighting unit 2, which is designed to be planar and elongate. In FIG. 1, a transverse direction Q and a thickness direction D of the lighting unit 2 are marked. Furthermore, the illuminating device 1 comprises a profile-shaped carrier component 3. A longitudinal direction L of the illuminating device 1, which, in the state in FIG. 1, also corresponds to a longitudinal direction of the lighting unit 2 and a longitudinal direction of the carrier component 3, is oriented in a projecting manner in FIG. 1 and can be seen in FIG. 7.

The carrier component 3 is in the form of a carrier profile and is produced from a metal material such as aluminium or an aluminium alloy, formed with a cross section which is substantially constant along the longitudinal direction and for example extruded. In the cross section in FIG. 1, the carrier component 3 comprises a U-shaped cross-sectional shape which is open at the bottom.

In FIG. 1, the carrier component 3 is fixed directly to rails 5 of a support structure of a suspended intermediate ceiling, which is formed as a panel construction comprising panel elements 7. In this case, the carrier component 3 is received inside the thickness extension or thickness of the panel elements 7, a dimension t of the carrier component 3 in the thickness direction D being able to be for example t≈13 mm.

The panel elements 7 can be for example plasterboard panel elements. The rigid connection of the carrier component 3 to the rails 5, of which only one is shown by way of example in FIG. 1, can take place by means of screws 11, which are drawn only schematically. The carrier component 3 is thus rigidly connected to the support structure of the intermediate ceiling, which in turn is fixed to a structure which is not shown in greater detail, in particular to a solid raw ceiling. In FIG. 1, a plane E (shown in FIG. 1 by two chain-dotted lines) forms the outer face of the intermediate ceiling facing a space. After fixing the carrier component 3 to the rails 5, the carrier component 3 can be plastered from the outer face of the intermediate ceiling to achieve a clean connection to the panel elements 7. For this purpose, the carrier component 3 is in the form of a plaster profile in FIG. 1 and is provided with a multiplicity of teeth 4 on sides facing outwards, which teeth improve the connection of the plaster and the carrier component 3.

The carrier component 3 comprises a receiving region 13 in which the lighting unit 2 is received in such a way that the lighting unit 2 finishes flush with the carrier component 3 on a visible side S of the lighting unit 2. The carrier component 3 and the lighting unit 2 thus end in the vertical direction, in parallel with the thickness direction D, at the level of the plane E. In FIG. 1, the lighting unit 2 can be considered to be an insert which can be inserted in the carrier component 3.

The lighting unit 2 comprises a profile element 17 which is permeable to light, the cross-sectional shape of which is designed to be substantially U-shaped with two opposing limbs 19 and a substantially planar base portion 20. The limbs 19 extend in the thickness direction D. The lighting unit 2 is configured to output light substantially in the region of the base portion 20 through said portion. An inner region 23 of the profile element 17 is formed by the U-shaped cross-sectional shape of the profile element 17 in which light-generation devices 29 are arranged. The light to be output by the lighting unit 2 can be provided in operation by the light-generation devices 29.

The profile element 17 which is permeable to light is produced as a profile made of a plastics material, in particular polymethyl methacrylate (PMMA).

The lighting unit 2 further comprises a planar base part 31 which is in the form of a planar base profile and is produced from a metal material, in particular from aluminium or an aluminium alloy.

An opening 37 is formed between the limbs 19 of the profile element 17. The base part 31 is arranged in the region of the opening 37, is coupled to the profile element 17, and substantially closes the opening 37.

The base part 31 is provided in the region of the opposing longitudinal edges thereof with in each case one rib-type protrusion 41. By contrast, the limbs 19 are also formed in the end regions thereof, which define the opening 37, in each case with a protrusion 43 extending along the opening 37 along the longitudinal direction L of the profile element 17. Whereas the protrusions 41 point outwards in the transverse direction Q of the lighting unit 2, the protrusions 43 point inwards in the transverse direction Q, towards the centre of the opening 37. The protrusions 41 and 43 are in the form of connection devices for the interlocking connection of the profile element 17 which is permeable to light and the planar base part 31. In each case, a protrusion 41 is formed so as to correspond to a protrusion 43. When the base part 31 and the profile element 17 are assembled, said parts can engage with one another and in this way are reliably held on one another.

In FIG. 1, the lighting unit 2 can be released by means of magnetic force and thus is fixed to the carrier component 3 in an interchangeable manner. For this purpose, base-part-side and carrier-component-side devices are provided.

The carrier component 3 comprises two parallel grooves 47 which extend facing the receiving region 13 in the longitudinal direction L of the carrier component 3. For the magnetic fixing of the lighting unit 2, an elongate, sheet or strip-shaped ferromagnetic element 49 is arranged in each of the grooves 47. In each case, the ferromagnetic element 49 extends substantially over the entire length of the carrier component 3 in the longitudinal direction thereof. By means of an inverted T-shaped design of each of the planar grooves 47, see FIG. 1, the ferromagnetic element 49 is reliably held on the carrier component 3. Each of the two ferromagnetic elements 49 can be in the form of a steel sheet and is inserted in the respective groove 47.

The ferromagnetic elements 49 have only a small extension in the thickness direction D by comparison with the extension thereof in the transverse direction Q and thus require only little space, in particular in the thickness direction D. This is advantageous for a planar design of the lighting unit 2.

The planar base part 31 is provided with two parallel grooves 51 on a side facing away from the profile element 17 and from the inner region 23 thereof and, in the state in FIG. 1, on a side pointing towards the ferromagnetic elements 49, in FIG. 1, the upper side of the base part 31. A permanent magnet 53 is arranged in each of the grooves 51. The two permanent magnets 53 are used to fix the lighting unit 2 to the carrier component 3 in that the permanent magnets 53 magnetically adhere to the ferromagnetic elements 49.

Each of the permanent magnets 53 is in the form of a strip, but does not extend over the entire length of the lighting unit 2 in the longitudinal direction L of the lighting unit 2. Although only two permanent magnets 53 are shown in FIGS. 1 and 7, the lighting unit 2 can be provided for example with pairs of permanent magnets 53 at intervals along the longitudinal direction thereof, for example in such a way that the lighting unit 2 comprises four or six or eight or even more permanent magnets 53.

The strip-shaped design of the permanent magnets 53 in turn makes it possible to save space in the thickness direction D of the lighting unit 2. In cross section, see FIG. 1, the permanent magnets 53 are formed so as to be trapezoidal. The grooves 51 are in each case undercut and formed so as to correspond to the trapezoidal form of the permanent magnets 53 in such a way that the permanent magnets 53 are reliably held on the base part 31 in an interlocking manner in each case in the associated groove 51.

The permanent magnets 53 are thus used as base-part-side devices, and the ferromagnetic elements 49 as carrier-component-side devices, base-part-side and carrier-component-side devices cooperating to fix the lighting unit 2 to the carrier component 3.

The light-generation devices 29 each comprise one LED circuit board 61, which is populated with light-emitting diodes (LEDs) 62. In FIG. 1, the lighting unit 2 comprises two LED circuit boards, which are arranged adjacently to one of the limbs 19 in each case in the inner region 23. Each of the populated LED circuit boards 61 can be inserted from an end face of the profile element 17 into the inner region 23 thereof.

In the inner region 23, a panel-shaped optical waveguide element 67 is further arranged in parallel with the base part 31. In the cross section in FIG. 1, the optical waveguide element 67 additionally extends in parallel with the base portion 20 of the cross-sectional shape of the profile element 17 which is permeable to light. The optical waveguide element 67 can be provided for example with lasered points and/or can be printed and/or stamped. By means of the LEDs 62, light is laterally fed into the optical waveguide element 67 in edge regions 68 thereof. This is also referred to as edge or lateral coupling. For this purpose, the LED circuit boards 61 are arranged adjacently to the edge regions 68. In the case of a smaller design size in the thickness direction D and additionally with a relatively small number of LEDs 62 required, a uniform lighting effect is achieved by the lighting unit 2 in the region of the base portion 20.

Between the base part 31 and the optical waveguide element 67, an insulation element 71 is arranged in parallel therewith on a side of the base part 31 facing the inner region 23, which element substantially fills a spacing between the base part 31 and the optical waveguide element 67. By means of the insulation element 71, the base part 31 is shielded in an electrically insulated manner with respect to the LED circuit boards 61. Electrical contact of the LED circuit boards 61 with the base part 31 is thereby prevented. This is advantageous when the lighting unit 2 is operated with electrical current at relatively high voltages, for example above the maximum permitted contact voltage.

The insulation element 71 is formed by a film with an electrically insulating plastics material. By means of the insulation element 71, an electrically insulating plastics layer is thus produced between the planar base part 31 and the LED circuit boards 61.

The insulation element 71 is additionally formed as a reflector, and thus has a reflection effect in addition to the insulation function thereof. Due to being in the form of a reflector, the insulation element 71 ensures that the light generated by the LEDs 62 is emitted substantially by the base portion 20 in a desired manner, and losses are avoided.

For this purpose, the plastics film of the insulation element 71 can be provided with a light-reflecting layer or coating. The insulation element 71 thus comprises an electrically insulating plastics layer and a light-reflecting layer in a film-type component.

Each of the LED circuit boards 61 is arranged substantially perpendicularly to the insulation element 71, adjacently to an associated edge region 73 of the insulation element 71, the LED circuit boards 61 extending in each case substantially along the thickness direction D of the lighting unit 2 and thus in parallel with the limbs 19.

In this case, the insulation element 71 extends in parallel with the transverse direction Q and thus in each case transversely to each of the LED circuit boards 61 externally, towards the respectively adjacent limbs 19, beyond an edge 63 of the LED circuit boards 61. In this way, the path which possible leakage currents have to travel from the LED circuit board 61 to the base part 31 is enlarged, the path of the possible leakage current now leads around the edge region 73 of the insulation element 71. Leakage currents are thus prevented or kept sufficiently low, with a small distance between the circuit boards 61 and the base part 31 and thus a more planar and more compact design size of the lighting unit 2 at the same time.

Furthermore, the insulation element 71 also protrudes on both sides beyond a lateral edge 33 of the planar base part 31, towards the limbs 19 of the U-shaped cross-sectional shape, to which limbs the LED circuit boards 61 are adjacent. In addition, see FIG. 1, in each of the limbs 19, a groove 79 is provided on the side thereof facing the inner region 23. In the two opposing edge regions 73, the insulation element 71 extends in each case into one of the grooves 79. In this way, the shielding and insulating effect of the insulation element 71 can be further increased.

A clearance 83 is formed adjacently to a bottom 24 of the inner region 23, which bottom is formed by an upper face of the profile element 17 facing the inner region 23 in the region of the base portion 20. In the clearance 83, if required, a panel-shaped optical element (not shown in greater detail in the drawings), in particular a microprismatic panel, can be received in order to vary the achieved illumination effect and/or allow additional glare suppression. To form the clearance 83, the profile element 17 which is permeable to light comprises two ribs 89 sticking out from the bottom 24 which each extend adjacently to one of the limbs 19, but are shorter than the limbs 19. On the ribs 89, see FIG. 1, the optical waveguide element 67 is close to the edge regions 68 thereof, by means of which a spacing from the bottom 24 is produced, and the clearance 83 is made possible. Between in each case a limb 19 and the rib 89 adjacent to said limb 19, the LED circuit board 61 is additionally arranged, the rib 89 being able to provide additional guidance and additional support for the LED circuit board 61.

Although the profile element 17 comprises the ribs 89, the grooves 79 and the protrusions 43, the cross-sectional shape of the profile element 17 in its entirety, that is to say as a whole, is still substantially U-shaped.

In all the second to fifth embodiments described below with reference to FIG. 2-5, the lighting unit 2 is formed in the same way as explained above and in the following with regard to the first embodiment. With regard to the lighting unit 2, reference is additionally made to FIG. 2-5, in which details of the lighting unit 2 are provided with reference signs for the sake of a better overview in FIG. 1.

For the design of the lighting unit 2, reference is additionally made to the exploded view in FIG. 7, which also shows in particular the design of the permanent magnets 53 which is shorter by comparison with the overall length of the lighting unit 2. In FIG. 7, an end-face end cover 59 for the lighting unit 2 and an anti-fall guard 55 are further drawn in. Furthermore, in FIG. 7, the longitudinal direction L is additionally drawn in, which is meant to show, in the inserted state in FIG. 1, the longitudinal direction of the illuminating device 1 (not shown completely in FIG. 7) as well as the longitudinal direction of the lighting unit 2 and the longitudinal direction of the carrier component 3 (not visible in FIG. 7).

In the first embodiment in FIG. 1, the carrier component 3 which is in the form of a plaster profile is rigidly connected to a solid ceiling via the rails 5, for example rigidly screwed to the rails 5 with force. If settling processes occur in the structure, such as can occur in particular in new buildings, deformation, and in particular a lowering of the solid ceiling, can occur in the admissible range, for example of the order of a few millimeters. The rigid connection of the carrier component 3 and the structure (not shown in FIG. 1) can, in such a case, lead to a deformation of the carrier component 3, for example a bending and/or a warping.

By forming the profile element 17 which is permeable to light from a plastics material in combination with forming the base part 31 from a metal material, the lighting unit 2 can be given a resilience and flexibility which allows the lighting unit 2 to adapt to such deformations.

The plastics material of the profile element 17 in this case forms a first material, and the metal material of the base part 31 forms a second material, the first material offering less resistance to an elastic deformation than the second material. The modulus of elasticity of the first material is thus lower than the modulus of elasticity of the second material. If, as for the embodiment in FIG. 1, a polymethyl methacrylate (PMMA) is used as the first material and an aluminium alloy is used as the second material, then for example the modulus of elasticity of the aluminium alloy is greater than the modulus of elasticity of the PMMA by a factor of approximately 20 or more. Taking into consideration the different area moments of inertia of the profile element 17 and of the base part 31, by means of the relatively planar design of the base part 31, a sufficient resilience of the lighting unit 2 in its entirety can be achieved. The U-shaped cross-sectional shape of the profile element 17 in this case does not lead to an excessive increase in the rigidity of the lighting unit 2. At the same time, by means of the magnets 53, the forces required for fixing and supporting the lighting unit 2 are introduced into a sturdy metal component.

The magnetic fixing of the lighting unit 2 to the carrier component 3 in combination with the flexibility of the lighting unit 2 in this case has the advantage that a release of the fixing in the event of changes in geometry of the carrier component 3 is avoided. The resilience of the lighting unit 2 avoids excessive tensions therein, and fixing points are thus subjected to less stress, and the magnets 53 remain reliably adhered to the ferromagnetic elements 49. In addition, the magnetic fixing allows shifts between the carrier component 3 and the lighting unit 2, which can result from the deformation of the carrier component 3, without the fixing being released.

The embodiment in FIG. 1 is thus advantageous not only in the case of settling processes in a structure, but improved stability with respect to vibrations can also be achieved, i.e. for example in the case of an oscillating deformation of the carrier component 3. This can be useful for example when using the illuminating device 1 in surroundings in which vibrations and tremors occur relatively frequently, since in this way, in particular the fixing can be made more secure.

In the first embodiment in FIG. 1, an electrical connection device 95 of the lighting unit 2, for example a terminal box, can be completely hidden in or behind the intermediate ceiling formed by the panel elements 7. The lighting unit 2 of the illuminating device 1 can be operated for example together with a ceiling installation converter (not shown), which is arranged outside the lighting unit 2.

In one variant of the embodiment in FIG. 1, the carrier component 3 can be designed to be installed in a recess (not shown in the drawing) in a solid ceiling or wall and rigidly fixed in the recess. Analogously to the view in FIG. 1, by plastering, a flush finish can be achieved in the plane E, which in this case illustrates the surface of the solid ceiling or wall.

The lighting unit 2 is fixed to the carrier component in the second to fifth embodiments in the same manner and with the above-mentioned advantages by means of magnetic force as in the first embodiment. With respect to the design of the lighting unit 2 and the coupling thereof to the carrier component, reference is made to the above designs from the first embodiment.

FIG. 2 shows an illuminating device 101 according to a second embodiment. The illuminating device 101 comprises a carrier component 103 and differs from the illuminating device 1 in that the carrier component 103 is not in the form of a plaster profile, but rather comprises flanges 106 which remain visible after installation of the carrier component 103 in a suspended intermediate ceiling, which forms a panel construction, the flange 106 being located on the outer face of the intermediate ceiling, shown schematically in FIG. 2 by the plane E. As in the first embodiment, the carrier component 103 is formed, for example extruded, as a carrier profile made of a metal material, for example aluminium or an aluminium alloy. With regard to fixing the carrier component 103 to a support structure of an intermediate ceiling, reference is made to the above explanations of the first embodiment.

Alternatively, the carrier component 103 can be constructed according to FIG. 2 to be installed in a recess (not shown in the drawing) in a solid ceiling or wall and rigidly fixed in the recess, the flanges 106 then being located, analogously to the view in FIG. 2, on the surface of the solid ceiling or wall, which is then formed in this case by the plane E.

FIG. 3 shows an illuminating device 201 according to a third embodiment. The illuminating device 201 comprises a carrier component 203 and differs from the illuminating device 1 in that the carrier component 203 is designed to be mounted on a ceiling, which can be a solid ceiling or an intermediate ceiling in the form of a panel construction. In this case, no portion of the carrier component 203 thus extends into the ceiling or intermediate ceiling. A plane E in FIG. 3 illustrates the visible outer face of the solid ceiling or the intermediate ceiling. The carrier component 203 can be rigidly connected for example by screwing to the solid ceiling or a support structure of the intermediate ceiling. Alternatively, a fixing in the wall region is considered. Screws 11 are shown by way of example in FIG. 3. The illuminating device 201 is thus located as a whole on the ceiling or wall or panel construction.

As in the preceding embodiments, the carrier component 203 is produced, for example by extrusion, as a carrier profile made of a metal material, for example aluminium or an aluminium alloy. However, the carrier component 203 comprises a first portion 203a and a second portion 203b, the second portion 203b being formed with the receiving region 13 for the lighting unit 2, and the first portion 203a being used as a foot for fixing the carrier component 203 to the ceiling. The first portion 203a additionally comprises an interior 203c, in which a converter 96 connected to the lighting unit 2 is accommodated.

FIG. 4 shows an illuminating device 301 according to a fourth embodiment. The illuminating device 301 comprises a carrier component 303 which is formed in the same way as the carrier component 203 in FIG. 3 and comprises a first portion 303a and a second portion 303b. In turn, the second portion 303b comprises the receiving region 13 for the lighting unit 2, whilst a converter 96 is received in an interior 303c of the first portion 303a. However, the illuminating device 301 differs from the illuminating device 201 in that the first portion 303a is received in portions inside an inverted U-shaped plaster profile 306 between the limbs 306a thereof. The plaster profile 306 can be arranged for example in the region of an intermediate ceiling and rigidly mounted on a support structure of the intermediate ceiling, analogously to the fixing of the carrier component 3 in FIG. 1. A plane E, which forms the outer face of the intermediate ceiling, is drawn in FIG. 4 for illustration. By plastering the plaster profile 306, which comprises teeth 4 for better adhesion of the plaster to outer faces of the limbs 306a, a clean transition is achieved in the region of the ends of the limbs 306a.

In the fourth embodiment, a segment of the first portion 303a is thus located inside the plaster profile 306 between the limbs 306a. The carrier component 303 is rigidly connected to the plaster profile 306, for example by screwing. Screws 11 for forming a rigid connection of this type are indicated by way of example in FIG. 4. In FIG. 4, the carrier component 303 is thus rigidly connected to a structure via the plaster profile 306 and for example the support structure of the intermediate ceiling. In the fourth embodiment, electronic and electrical components in the form of the converter 96 can thus be concealed in at least some portions in the ceiling, by contrast with FIG. 3.

The carrier component 303 is in turn produced, for example by extrusion, as a carrier profile made of a metal material, for example aluminium or an aluminium alloy. The plaster profile 306 can also be produced, for example extruded, from a metal material, for example aluminium or an aluminium alloy.

FIG. 5 shows an illuminating arrangement 401 according to a fifth embodiment. The illuminating arrangement 401 comprises a carrier component 403, which is formed in the same manner as the carrier component 203 or 303 from FIG. 3 and FIG. 4 respectively. In the fifth embodiment, the carrier component 403 is suspended in the ceiling region by means of suitable suspension means 410 which can contain for example cables and/or bars or rods. In this case, the fixing can take place for example on a solid ceiling or a construction (not shown) fixed to the solid ceiling. A ceiling plane E is in turn drawn in FIG. 5. It is understood that the illuminating device 401 can have a relatively great length and can be suspended from the ceiling by means of a multiplicity of suspension means 410 along the longitudinal direction of said device projecting in FIG. 5.

FIG. 6 shows an illuminating device 501 according to a sixth embodiment. The illuminating device 501 comprises a lighting unit 502 and two profile-shaped carrier components 503, the lighting unit 502 being arranged between the two carrier components 503 and fixed to the carrier components 503. The two carrier components 503 are in the form of ceiling profile elements of a support structure for a grid ceiling (not shown in its entirety in FIG. 6) and extend in parallel with one another and for example substantially in the horizontal direction.

The lighting unit 2 is, with the exception of the planar base part and base-part-side devices for fixing the lighting unit 502 to the carrier components 503, formed in the same manner as described in the preceding embodiments of the invention, and therefore reference can be made to the above embodiments of the lighting unit 2.

Instead of the planar base part 31, as has been described in detail above, the lighting unit 502 comprises a planar base part 531. The base part 531 differs from the base part 31 of the lighting unit 2 in that the base part 531 comprises movable catches 597 instead of the magnets 53. Each of the catches 597 is guided in a catch housing 598 in such a way that the catch 597 can be moved in the transverse direction Q. The catches 597 are each spring-loaded in such a way that, in the absence of external forces acting on the catches 597, the catches 597 protrude outwards beyond opposing, lateral longitudinal edges 502a of the lighting unit 502. Each of the catches 597 can be pushed back against a spring tension into the allocated catch housing 598 thereof.

To fix the lighting unit 502 to the carrier components 503, the lighting unit 502 is inserted between the carrier components 503 in the arrow direction P, see FIG. 6, in each case one slide ramp 597a of the catch 597 coming into contact with one of the carrier components 503. This means that when the insertion of the lighting unit 502 between the carrier components 503 is continued, the catches 597 are each pushed into the catch housing 598. After passing a portion of the carrier components 503 which is expanded into a T-shape, the catches 597 snap behind the portion of the carrier components 503, by means of which the lighting unit 502 is reliably fixed in an interlocking manner to the carrier components 503.

Catch housings 598 with in each case one catch 597 arranged therein can be fixed at intervals to the planar base part 531 along the longitudinal direction of the lighting unit 502 projecting in FIG. 6. If deformations of the carrier components 503 occur in the illuminating device 501 from FIG. 6 as a result of settling processes or other causes, the lighting unit 502 can follow such a deformation well due to the resilience and flexibility already explained above. In this way, an aesthetically pleasing appearance of the illuminating device 501 is maintained, non-flush transitions or the like are avoided, and any effects of forces caused by deformation on the catches 597 can be reduced.

From FIG. 1-7, it can additionally be seen that each of the illuminating devices 1, 101, 201, 301, 401, 501 can be designed to be substantially symmetrical in relation to a centre plane which extends in a vertical and projecting manner in each of FIG. 1-6. The cross sections of the carrier components 3, 103, 203, 303, 403, 503 and the cross sections of the profile element 17, the planar base parts 31 and 531, and the plaster profile 306 are in each case substantially constant along the longitudinal direction L thereof.

All the illumination arrangements 1, 101, 201, 301, 401, 501 described previously with reference to FIG. 1-7 are each formed with a comparatively great length along the respective longitudinal direction thereof. The resilient lighting unit 2 and 502, in all the embodiments described previously, allows an advantageous adaptation of the lighting unit 2, 502 to changes in geometry of the carrier component 3, 103, 203, 403 and 503, the changes in geometry being able to be attributed in particular in the embodiments in FIGS. 1-4 and 6 to settling processes of a structure and, in the case of FIG. 5, to deformations of the carrier component 403, for example to the weights acting over the length of the relatively long, suspended illuminating device 401.

In all the embodiments explained previously, the lighting unit 2 or 502 ends flush with the carrier component 3, 103, 203, 303, 403 or with the carrier components 503 on the visible side S of said unit. Even in the event of deformations of the respective carrier component(s), the clean, flush transition and thus the pleasing appearance can be maintained well in the case of the invention.

It should be noted that, in the previous embodiments, a plurality of successive lighting units 2 in the longitudinal direction L can be received in the carrier component 3, 103, 203, 303 or 403, or a plurality of successive lighting units 502 in the longitudinal direction L between the carrier components 503 can be fixed to said components. The lighting units 2, 502 can each have a comparatively great length in the longitudinal direction L, for example a length of up to for example 3200 mm. However, lighting units 2, 502 can be provided with smaller lengths, for example approximately 600 mm long or approximately 1200 mm long or approximately 1800 mm long or approximately 2400 mm long. However, it should be understood that these lengths are given by way of example, and other dimensions of the lighting units 2, 502 in the longitudinal direction L are conceivable.

Furthermore, it should be noted that the embodiments described above can also be used in conjunction with panel constructions in the wall region.

Although the present invention has been fully described above by means of various embodiments, it is not limited to the above, but may be modified in multiple ways.

In particular, it is not absolutely necessary for the carrier component, as in the first to sixth embodiments, to extend in a straight line along the longitudinal direction thereof, but rather the carrier component could follow for example a curved path in a wall or ceiling plane. A correspondingly curved path is also conceivable for the lighting unit.

The invention claimed is:

1. An illuminating device,
comprising a planar, elongate lighting unit; and
comprising a profile-shaped carrier component;
wherein the lighting unit is constructed for fixing thereof to the carrier component;
wherein the lighting unit comprises a profile element which is permeable to light in at least some portions and has a cross-sectional shape which is U-shaped in at least some portions, opposing limbs of the U-shaped cross-sectional shape extend substantially in the thickness direction of the lighting unit, and an inner region of the profile element is formed with an opening formed between the limbs by the U-shaped cross-sectional shape;
wherein the lighting unit further comprises a planar base part which is arranged in the region of the opening and is coupled to the profile element;
wherein the profile element which is permeable to light in at least some portions is formed by a first material which offers less resistance to a deformation than a second material by which the planar base part is formed; and
wherein, in the inner region, a light-generation device for generating light which can be emitted in operation by the lighting unit is arranged.

2. The illuminating device of claim 1,
wherein a modulus of elasticity of the first material is lower than a modulus of elasticity of the second material.

3. The illuminating device of claim 1,
wherein the profile element which is permeable to light in at least some portions is in the form of a profile made of the first material, and the planar base part is in the form of a profile made of the second material.

4. The illuminating device of claim 1,
wherein, on the base part, at least one base-part-side device is arranged for fixing the lighting unit to the carrier component.

5. The illuminating device of claim 4,
wherein, on the carrier component, at least one carrier-component-side device is arranged, which cooperates with the base-part-side device to fix the lighting unit to the carrier component.

6. The illuminating device of claim 1,
wherein the lighting unit can be fixed to the carrier component by magnetic force or the lighting unit can be fixed in an interlocking manner to the carrier component by a catch.

7. The illuminating device of claim 1,
wherein the carrier component is provided with at least one ferromagnetic element for fixing the lighting unit, the ferromagnetic element being held on the carrier component in a groove of the carrier component.

8. The illuminating device of claim 1,
wherein the lighting unit comprises at least one magnet for fixing the lighting unit, the magnet being held on the base part in a groove of the base part.

9. The illuminating device of claim 1,
wherein the light-generation device comprises at least one LED circuit board, which is arranged adjacently to one of the limbs in the inner region of the profile element.

10. The illuminating device of claim 9,
wherein the lighting unit comprises an insulation element which is in the form of a film or layer and is arranged on a side of the planar base part facing the inner region in order to shield, in an electrically insulating manner, the base part with respect to the LED circuit board.

11. The illuminating device of claim 10,
wherein the insulation element protrudes in a direction which is transverse to the LED circuit board beyond an edge of the LED circuit board.

12. The illuminating device of claim 11,
wherein the LED circuit board extends transversely to the insulation element.

13. The illuminating device of claim 10,
wherein the insulation element protrudes beyond a lateral edge of the planar base part towards the limb of the U-shaped cross-sectional shape which is adjacent to the LED circuit board.

14. The illuminating device of claim 10,
wherein the insulation element extends in an edge region thereof into a groove in the profile element which is permeable to light in at least some portions.

15. The illuminating device of claim 1,
wherein, in the inner region, a panel-shaped optical waveguide element is arranged substantially in parallel with the planar base part, the light-generation device being arranged adjacently to an edge region of the optical waveguide element for laterally feeding light into the optical waveguide element.

16. The illuminating device of claim 10, wherein the insulation element is arranged between the planar base part and an optical waveguide element and is in the form of a reflector.

17. The illuminating device of claim 10, wherein the insulation element is arranged between the planar base part and an optical waveguide element and is provided with a light-reflecting component.

18. The illuminating device of claim 17,
wherein the insulation element is provided with a light-reflecting layer or coating.

19. The illuminating device of claim 1,
wherein the profile element which is permeable to light in at least some portions is produced from a plastics material as the first material and the planar base part is in the form of a base profile which is produced from a metal material as the second material.

20. A lighting unit,
wherein the lighting unit is designed to be planar and elongate and constructed for fixing thereof to a profile-shaped carrier component;
wherein the lighting unit comprises a profile element which is permeable to light in at least some portions and has a cross-sectional shape which is U-shaped in at least some portions, opposing limbs of the U-shaped cross-sectional shape extend substantially in the thickness direction of the lighting unit, and an inner region of the profile element is formed with an opening formed between the limbs by the U-shaped cross-sectional shape;
wherein the lighting unit further comprises a planar base part which is arranged in the region of the opening and is coupled to the profile element;
wherein the profile element which is permeable to light in at least some portions is formed by a first material which offers less resistance to a deformation than a second material by which the planar base part is formed; and
wherein, in the inner region, a light-generation device for generating light which can be emitted in operation by the lighting unit is arranged.

* * * * *